July 25, 1967 E. L. EVANS 3,332,703
STEERING MEANS FOR SELF-PROPELLED TRACKED VEHICLE
Filed June 7, 1965 2 Sheets-Sheet 1
FIG_1
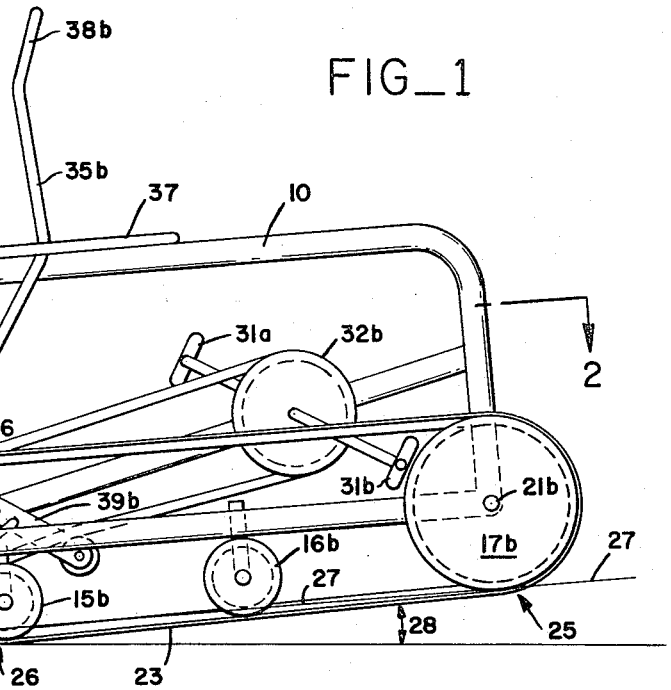
FIG_2
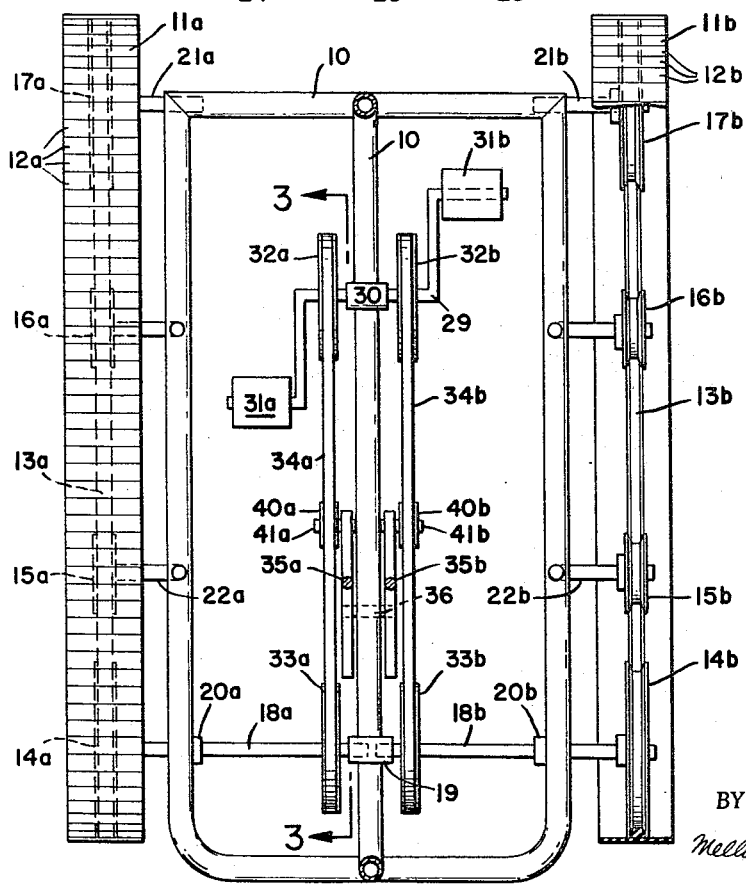
INVENTOR.
ELFERD L. EVANS
BY
Mellin, Moore + Weissenberger
ATTORNEYS July 25, 1967 E. L. EVANS 3,332,703
STEERING MEANS FOR SELF-PROPELLED TRACKED VEHICLE
Filed June 7, 1965 2 Sheets-Sheet 2
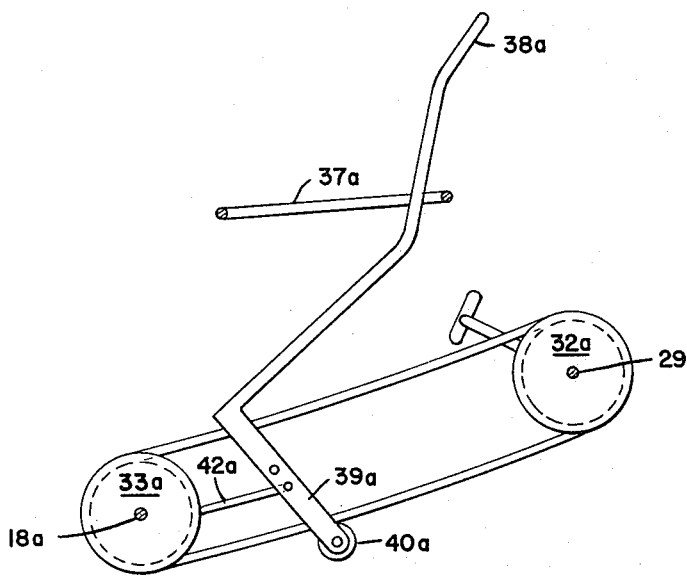
FIG_4
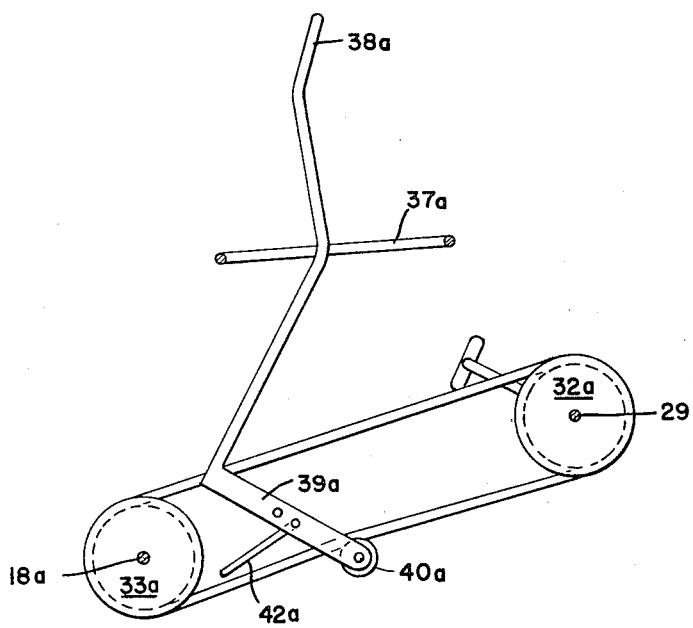
FIG_3
INVENTOR.
ELFERD L. EVANS
BY
Mellin, Moore & Weissenberger
ATTORNEYS

United States Patent Office 3,332,703
Patented July 25, 1967

3,332,703
STEERING MEANS FOR SELF-PROPELLED
TRACKED VEHICLE
Elferd L. Evans, 23772 Nevada Road,
Hayward, Calif. 94541
Filed June 7, 1965, Ser. No. 461,755
8 Claims. (Cl. 280—211)

This invention relates to a steering means for a self-propelled tracked vehicle such as a toy bulldozer or tractor.

A self-propelled tracked vehicle has generally not found acceptance as a children's toy because of the difficulties in steering it. In particular, the advancement of one track while the other remains stationary, to thereby alter the direction of the vehicle, is particularly difficult with human power. The portion of the stationary track in engagement with the ground or other supporting surface must be caused to arcuately sweep or scrape over the surface while the advancing track also sweeps or scrapes the surface, though to a lesser extent. Without the aid of the present invention, the sweeping action that must be imparted to the tracks requires power in excess of the amount reasonably supplied by the operator. Accordingly, prior to the present invention, a self-propelled tracked vehicle has not been practical because it could not be easily steered.

The present invention decreases the portion of the track that must sweep or scrape across the supporting surface when the vehicle direction is changed. The frictional force that must be overcome to steer the vehicle is, accordingly, decreased and steering by self-provided power is practical.

The invention has among its objects:

To provide a steering means for a self-propelled tracked vehicle,

To provide a tracked vehicle having means for discriminately advancing one of the tracks independently of the other and means for conveniently decreasing the length of both tracks in engagement with the ground or other supporting surface while advancing one, To provide steering means for a tracked vehicle including means for offsetting the ground-engaging span of each track so that the vehicle may be tilted about an axis transverse to the direction of travel passing through the offset means, to thereby alter the portion of the ground engaging span in contact with the ground or other supporting surface, To provide steering means for a self-propelled tracked vehicle including lever-operated means for discriminately applying rotational power to each track and associated means for braking the track to which no power is being supplied, and To provide steering means for a self-propelled tracked vehicle wherein the ground-engaging span of each track is offset and means is provided for adjusting the center of gravity of the combined mass (the vehicle plus the operator) so that it lies substantially in a vertical plane passing through the point of maximum offset of the ground-engaging span.

Each of the above objects is fulfilled by the apparatus shown in the specific embodiment which appears in FIGS. 1–4, wherein:

FIG. 1 is a side view of the present invention,

FIG. 2 is a sectional view taken on the line 2—2 of FIG. 1,

FIG. 3 is a sectional view taken on the line 3—3 of FIG. 2 and shows the means for supplying power to the left track in a position to prevent drive belt slippage to thereby cause advancement of the left track with rotation of the crankshaft, and FIG. 4 is a sectional view taken on the line 3—3 of FIG. 2 and therefore similar to FIG. 3, but shows the means for supplying power to the left track in a position which prevents advancement of the track when the crankshaft is rotated.

The present invention appears primarily in FIGS. 1 and 2, and includes a frame 10 and a pair of parallel spaced tracks 11a and 11b. The vehicle is symmetrical about the longitudinal center line thereof, and all parts on the left side, looking forward, which are identified by a reference numeral and a letter "a" find their counterpart on the right side wherein such counterparts are designated by the same reference numeral and the letter "b." Each track 11a and 11b may be made of any flexible material such as rubber, and includes treads 12a and 12b and ribs 13a and 13b integrally formed and having a V cross section as shown in FIG. 2. Ribs 13a and 13b ride, respectively, in rear pulleys 14a and 14b, offset pulleys 15a and 15b, idler pulleys 16a and 16b, and front pulleys 17a and 17b.

Rear pulleys 14a and 14b are keyed to drive shafts 18a and 18b, which are mounted in bearings 19 and 20a and 20b on frame 10. The two drive shafts 18a and 18b are provided, for rear pulleys 14a and 14b respectively, so that rear pulley 14a is rotatable independently of rear pulley 14b.

The front pulleys 17a and 17b are rotatably mounted on shafts 21a and 21b, which are secured to frame 10.

Offset pulleys 15a and 15b are rotatably mounted on L shafts 22a and 22b and are critically positioned. Offset pulleys 15a and 15b must be positioned to offset the ground-engaging spans 23 of the tracks. Ground-engaging spans 23 extend from point 24 on the circumference of the rear pulleys to point 25 on the circumference of the front pulleys. Ground-engaging spans 23 are those portions of the tracks which, in the absence of being offset, would engage the ground or other supporting surface. Offset pulleys 15a and 15b are disposed so that a point 26 on the circumference thereof lies below the line 27 drawn tangentially from a point 24 on a rear pulley below the rotational axis (drive shaft 18a or 18b) thereof to a point 25 on the front pulley below the rotational axis (shaft 21a or 21b) thereof. Thus, the ground-engaging spans 23 of the tracks are offset to make the vehicle tiltable about point 26.

For steering, the vehicle may be tilted so that only the portions of ground-engaging spans 23 lying between the rear pulleys and offset pulleys are in engagement with the ground or other supporting surface as is shown in FIG 1. For normal one-directional travel, the vehicle may be tilted to a position (not shown) wherein that portion of ground-engaging spans 23 lying between the offset pulleys and the front pulleys engages the ground or other supporting surface.

The angle 28 shown in FIG. 1 is not particularly critical. It is preferred, however, that it lie within the range of 2–10° to provide a meaningful angular variation in the ground-engaging spans 23 for operation on soft ground and to avoid a larger angle which makes the degree of tilting uncomfortable to the operator.

Idler pulleys 16a and 16b are provided for additional support to the portions of the ground-engaging spans 23 lying between the offset pulleys and the front pulleys. Though nonessential, they ensure that the ground-engaging spans 23 are frictionally engaged with the supporting surface substantially throughout the length from the offset pulleys to the front pulleys.

Means for discriminately advancing the tracks is provided and includes crankshaft 29, which is rotatably mounted in bearing 30 secured to frame 10. Crankshaft 29 is provided with a pair of pedals 31a and 31b, and crankshaft pulleys 32a and 32b are keyed thereto as shown.

Drive shaft pulleys 33a and 33b are aligned with crankshaft pulleys 32a and 32b respectively, and are keyed to drive shafts 18a and 18b respectively. Drive belts 34a and 34b, conventional V belts, extend from crankshaft pulleys 32a and 32b to drive shaft pulleys 33a and 33b respectively.

The length of belts 34a and 34b are chosen so that they extend loosely about their associated pulleys. Thus, in the absence of tightening, rotation of crankshaft 29 and crankshaft pulleys 32a and 32b fails to impart rotational movement to drive shaft pulleys 32a and 33b because of slippage.

Steering levers 35a and 35b are pivotally mounted at pin 36 to frame 10 and extend through lever guides 37a and 37b respectively. The steering levers are generally L-shaped and include handle portions 38a and 38b and a foot portion such as 39a. Belt-tensioning rollers 40a and 40b are rotatably mounted to the end of the foot portions at pins 41a and 41b. Foot portion 39a also includes brake member 42a which, when lever 35a is in a forward position as shown in FIG. 4, engages its associated drive shaft pulley 33a.

Steering levers 35a and 35b are pivotable about pin 36 from a forward position as shown in FIG. 4 to a rearward position as shown in FIG. 3. When handle 38a is pulled back, the pivoting of foot portion 39a about pin 36 causes belt-tensioning roller 40a to contact drive belt 34a and force it generally upwardly. Thus belt 34a is tightened on crankshaft pulley 32a and drive shaft pulley 33a, and becomes frictionally engaged therewith. When so tightened, rotation of crankshaft 29 and crankshaft pulley 32a imparts rotation to drive shaft pulley 33a and track 11a because slippage is prevented.

When steering lever 35a is in its extreme forward position, brake member 42a engages its associated drive shaft pulley 33a and simultaneously releases belt-tensioning roller 40a from engagement with drive belt 34a. Rotation of crankshaft 29, therefore, imparts no rotation to drive shaft pulley 33a. Consequently, when steering lever 35a is in a forward position, the associated track cannot be advanced, even though crankshaft 29 is rotated.

It will therefore be readily understood that to advance both tracks 11a and 11b, pedals 31a and 31b must be operated to rotate crankshaft 29 and both steering levers 35a and 35b must be retracted to the position shown in FIG. 3. To advance track 11a independently of track 11b, steering lever 35a must be retracted and steering lever 35b must be in a forward position. With lever 35a retracted and 35b forward, brake member 42b engages drive shaft pulley 33b, and belt-tensioning roller 40b loosens drive belt 34b to thereby prevent rotation of track 11b. To advance track 11b only, steering lever 35a must be in a forward position and steering lever 35b in a retracted position.

Seat 43 is adjustably mounted to frame 10 for both vertical and horizontal adjustment. For that purpose, bolt 44 is associated with vertical slot 45 for vertical adjustment and horizontal slot 46 for horizontal adjustment. The horizontal adjustment on a line parallel to the direction of travel of the vehicle and also substantially parallel to the ground-engaging span 23 provides a means for adjusting the center of gravity of the vehicle plus its operator. By varying the horizontal position of seat 43 (and consequently the center of gravity of the operator sitting on seat 43), the center of gravity of the combined mass (operator plus vehicle) may be shifted. By so shifting the center of gravity of the combined mass, it may be adjusted to lie substantially in a vertical plane passing through the rotational axis of the offset pulleys. When so adjusted, any forward or rearward movement of the operator, such as by leaning forward or leaning backward, further varies the center of gravity of the combined mass and shifts it from one side of the vertical plane, referred to above, to the other. By so shifting his weight, the operator can therefore make the vehicle tilt rearwardly, as shown in FIG. 1, or forwardly, and thereby alter the portion of ground-engaging span 23 in engagement with the ground.

For forward movement the portions of ground-engaging spans 23 between the offset pulleys and front pulleys are utilized. In a turning movement, the operator causes the vehicle to assume the position shown in FIG. 1 by leaning backward, and that portion of ground-engaging spans 23 between the rear pulleys and the offset pulleys is utilized. Thus, in a turning movement, the length of tracks 11a and 11b in engagement with the ground or other supporting surface is significantly decreased as compared to the total ground-engaging span of the vehicle. The significant decrease correspondingly decreases the frictional forces between the tracks and the supporting surface. Accordingly, the sweeping or scraping of the tracks required in a turn may be accomplished with power supplied only by the operator.

It will be readily understood that to go forward, both steering levers 35a and 35b must be retracted and crankshaft 29 rotated. To turn right, the vehicle must be tilted rearwardly as shown in FIG. 1 and steering lever 35a must be retracted with steering lever 35b in a forward position. To turn left, the vehicle must assume the position shown in FIG. 1 and steering lever 35a must be in a forward position with steering lever 35b retracted.

Various changes in the design shown may be made without departing from the scope of the invention. The offset pulleys, for example, may be eliminated and replaced with a stationary bar which engages the tracks without rotating. Various means may be employed to discriminately drive the tracks, including means for varying the length between the crankshaft pulleys and drive shaft pulleys rather than the belt-tensioning roller shown. A transmission could be provided to discriminately supply power to the tracks from the primary power source. Moreover, the front and rear pulleys could be replaced with a series of radially positioned smaller pulleys. Each of such changes is within the scope of the invention and the claims which follow.

Having thus described the invention, I claim:

1. Steering means for an occupant-propelled tracked vehicle having a frame and a pair of parallel tracks, each mounted on a front and rear pulley to define a ground-engaging span, which comprises: means for discriminately advancing one of said tracks independently of the other, means for offsetting said ground-engaging span such that a point thereof lies below a line extending tangentially from a point on said rear pulley below the rotational axis thereof to a point on said front pulley below the rotational axis thereof, said means for offsetting said ground-engaging span being nearer said rear pulley than said front pulley, and seating means positioned such that the center of gravity of the combination of said tracked vehicle and the operator thereof seated on said seat lies substantially in a vertical plane passing through said means for offsetting said ground-engaging span, whereby when said operator leans forwardly said vehicle tilts forwardly about said means for offsetting said ground-engaging span and when said operator leans rearwardly said vehicle tilts rearwardly.

2. The steering means of claim 1 wherein said means for offsetting said ground-engaging span includes a pulley mounted for engagement therewith.

3. The steering means of claim 1 and means for braking one of said tracks while advancing the other.

4. The steering means of claim 1 wherein said means for discriminately advancing one of said tracks independently of the other includes: a crankshaft rotatably mounted to said frame, a pair of crankshaft pulleys rotatable with said crankshaft, a pair of drive shaft pulleys rotatably mounted to said frame, a pair of drive shafts extending from said drive shaft pulleys to said rear pulleys respectively, a pair of endless belts extending loosely from said crankshaft pulleys to said drive shaft pulleys respectively for slippage therein, and means for tightening each of said belts independently of the other to thereby eliminate said slippage.

5. The steering means of claim 4 wherein said means for tightening each of said belts independently of the other includes a pair of levers pivotally mounted to said frame, each of said levers having a roller rotatably mounted thereto for engagement with one of said belts as said lever is pivoted.

6. The steering means of claim 5 and a brake member mounted to each of said levers for engagement with one of said drive shaft pulleys when said lever is pivoted to disengage said spool from said belt.

7. Steering means for an occupant-propelled tracked vehicle having a frame and a pair of parallel tracks, each mounted to a front and rear pulley to define a ground-engaging span, which comprises: means disposed nearer said rear pulley than said front pulley for offsetting said ground-engaging span such that a point thereof lies below a line extending tangentially from a point on said rear pulley below the rotational axis thereof to a point on said front pulley below the rotational axis thereof, a pedal-actuated crankshaft for advancing said tracks rotatably mounted to said frame forwardly of said means for offsetting said ground-engaging span, means for discriminately advancing one of said tracks independently of the other, and seating means mounted to said frame rearwardly of said means for offsetting said ground-engaging span such that when the operator of said vehicle, seated on said seating means, leans forwardly said vehicle tilts forwardly about said means for offsetting said ground-engaging span, and when said operator leans rearwardly said vehicle tilts rearwardly about said means for offsetting said ground-engaging means.

8. Steering means for an occupant-propelled tracked vehicle having a frame and a pair of parallel tracks, each mounted on a front and rear pulley to define a ground-engaging span, which comprises: means for discriminately advancing one of said tracks independently of the other including a crankshaft rotatably mounted to said frame, a pair of crankshaft pulleys rotatable with said crankshaft, a pair of drive shaft pulleys rotatably mounted to said frame, a pair of drive shafts extending from said drive shaft pulleys to said rear pulleys respectively, a pair of endless belts extending loosely from said crankshaft pulleys to said drive shaft pulleys respectively for slippage therein, and means for tightening each of said belts independently of the other to thereby eliminate said slippage; means for braking one of said tracks while advancing the other; an offset pulley disposed between said front and rear pulleys nearer said rear pulley than said front pulley for engagement with said ground-engaging span, said offset pulley having a point on the circumference thereof disposed below a line extending tangentially from a point on said rear pulley below the rotational axis thereof to a point on said front pulley below the rotational axis thereof; and an operator's seat adjustable on said frame in the direction of said ground-engaging span such that the center of gravity of said tracked vehicle with said operator on said seat may be adjusted to lie substantially in a vertical plane passing through said offset pulley.

References Cited
UNITED STATES PATENTS

| | | | |
|---|---|---|---|
| 1,376,347 | 4/1921 | McComb | 280—211 X |
| 1,590,696 | 6/1926 | Orr | 280—1.11 X |
| 2,436,619 | 2/1948 | Swindell | 280—211 |
| 3,239,021 | 3/1966 | Harvey | 180—6.7 |

KENNETH H. BETTS, *Primary Examiner.*